US010335773B2

(12) United States Patent
Shen et al.

(10) Patent No.: US 10,335,773 B2
(45) Date of Patent: Jul. 2, 2019

(54) FE-BASED HYDROGENATION CATALYST AND USE THEREOF

(71) Applicant: CHINA UNIVERSITY OF PETROLEUM-BEIJING, Beijing (CN)

(72) Inventors: Baojian Shen, Changping (CN); Hao Li, Changping (CN); Yandan Wang, Changping (CN); Jiancong Li, Changping (CN); Lei Li, Changping (CN); Bojun Shen, Changping (CN); Baohua Shen, Changping (CN); Wennian Wang, Changping (CN); Delin Yuan, Changping (CN); Honglian Xu, Changping (CN)

(73) Assignee: CHINA UNIVERSITY OF PETROLEUM—BEIJING, Beijing (CN)

( * ) Notice: Subject to any disclaimer, the term of this patent is extended or adjusted under 35 U.S.C. 154(b) by 352 days.

(21) Appl. No.: 14/905,719

(22) PCT Filed: Jul. 18, 2014

(86) PCT No.: PCT/CN2014/082463
§ 371 (c)(1),
(2) Date: Jan. 15, 2016

(87) PCT Pub. No.: WO2015/007230
PCT Pub. Date: Jan. 22, 2015

(65) Prior Publication Data
US 2016/0158733 A1 Jun. 9, 2016

(30) Foreign Application Priority Data

Jul. 18, 2013 (CN) .......................... 2013 1 0302954
Jul. 18, 2013 (CN) .......................... 2013 1 0303258

(51) Int. Cl.
*B01J 27/185* (2006.01)
*B01J 27/198* (2006.01)
*C01G 45/04* (2006.01)
*B01J 23/80* (2006.01)
*C10G 45/04* (2006.01)
*C10G 45/60* (2006.01)
*C10G 45/46* (2006.01)
*B01J 37/03* (2006.01)
*B01J 37/08* (2006.01)
*B01J 37/20* (2006.01)
*B01J 35/10* (2006.01)
*B01J 37/00* (2006.01)

(52) U.S. Cl.
CPC ........... *B01J 23/80* (2013.01); *B01J 27/1853* (2013.01); *B01J 27/198* (2013.01); *B01J 35/1014* (2013.01); *B01J 35/1019* (2013.01); *B01J 35/1038* (2013.01); *B01J 35/1042* (2013.01); *B01J 35/1061* (2013.01); *B01J 37/0009* (2013.01); *B01J 37/031* (2013.01); *B01J 37/08* (2013.01); *B01J 37/20* (2013.01); *C10G 45/04* (2013.01); *C10G 45/46* (2013.01); *C10G 45/60* (2013.01); *B01J 2523/00* (2013.01)

(58) Field of Classification Search
CPC ........ B01J 23/78; B01J 23/80; B01J 2523/00; C10G 45/04; C10G 45/46; C10G 45/60
See application file for complete search history.

(56) References Cited

U.S. PATENT DOCUMENTS

| | | | |
|---|---|---|---|
| 3,387,053 A | 6/1968 | Lee et al. | |
| 3,779,903 A | 12/1973 | Levinson | |
| 4,330,395 A | 5/1982 | Pott et al. | |
| 5,214,015 A | 5/1993 | Farcasiu et al. | |
| 6,156,695 A | 12/2000 | Soled et al. | |
| 6,582,590 B1 | 6/2003 | Riley et al. | |
| 6,712,955 B1 | 3/2004 | Hou et al. | |
| 6,783,663 B1 | 8/2004 | Miseo et al. | |
| 2002/0024038 A1 | 2/2002 | Iijima et al. | |
| 2007/0142483 A1* | 6/2007 | White | B01J 23/002 518/726 |
| 2012/0022174 A1 | 1/2012 | Yang et al. | |
| 2012/0156743 A1* | 6/2012 | Powell | C10G 3/00 435/155 |
| 2012/0323051 A1* | 12/2012 | Powell | C10G 3/00 568/913 |

(Continued)

FOREIGN PATENT DOCUMENTS

| | | |
|---|---|---|
| CA | 2559798 | 7/2005 |
| CA | 2559798 A1 | 7/2005 |

(Continued)

OTHER PUBLICATIONS

Machine translation of CN1245255C, Publication Date Mar. 2006.*

(Continued)

*Primary Examiner* — Jun Li
(74) *Attorney, Agent, or Firm* — Ohlandt, Greeley, Ruggiero & Perle, LLP

(57) ABSTRACT

The present invention relates to a Fe-based hydrogenation catalyst having Fe as a primary active metal component, and zinc and potassium as a first co-active metal component. The molar ratio of the primary active metal component to the first co-active metal component is 0.5-200:1. The Fe-based hydrogenation catalyst in present invention overcomes the problem of limiting to the active metal components as used over decades for the conventional hydrogenation catalyst, and thus has long-term values for industrial application.

19 Claims, No Drawings

(56) References Cited

U.S. PATENT DOCUMENTS

2013/0152456 A1* 6/2013 Powell .................. C10G 3/00
 44/307

FOREIGN PATENT DOCUMENTS

| | | | | |
|---|---|---|---|---|
| CN | 1086534 | A | 5/1994 | |
| CN | 1127240 | | 7/1996 | |
| CN | 1245255 | A | 2/2000 | |
| CN | 1253987 | | 5/2000 | |
| CN | 1289821 | A | 4/2001 | |
| CN | 1345910 | | 4/2002 | |
| CN | 1431048 | | 7/2003 | |
| CN | 1431048 | A | 7/2003 | |
| CN | 1458236 | A | 11/2003 | |
| CN | 1562471 | | 1/2005 | |
| CN | 1245255 | C * | 3/2006 | ............ B01J 21/08 |
| CN | 1766052 | | 5/2006 | |
| CN | 1778873 | | 5/2006 | |
| CN | 101037610 | | 9/2007 | |
| CN | 101255356 | A | 9/2008 | |
| CN | 101439289 | A | 5/2009 | |
| CN | 101612594 | | 12/2009 | |
| CN | 101612594 | A | 12/2009 | |
| CN | 102039140 | A | 5/2011 | |
| CN | 102188988 | | 9/2011 | |
| CN | 102309967 | A | 1/2012 | |
| CN | 1023099967 | | 1/2012 | |
| CN | 102604669 | A | 7/2012 | |
| CN | 102851061 | | 1/2013 | |
| CN | 102872908 | A | 1/2013 | |
| CN | 103084171 | A * | 5/2013 | ............ B01J 23/44 |
| CN | 102371154 | B | 6/2013 | |
| CN | 104383922 | | 3/2015 | |
| DE | 2536488 | B1 | 12/1976 | |
| WO | WO 2010121516 | A1 * | 10/2010 | ............ B01J 23/002 |

OTHER PUBLICATIONS

Chinese Office Action dated Apr. 1, 2016 corresponding to Chinese Application No. 201480000780.8; 8 pages.
Chinese Search Report dated Mar. 22, 2016 corresponding to Chinese Application No. 201480000780.8; 3 pages.
Canadian Office Action dated Dec. 1, 2016 for Canadian application No. 2,917,361.
European Search Report dated Jun. 6, 2017 for European application No. 14826159.7.
Chinese Office Action dated Feb. 3, 2016 corresponding to Chinese Application No. 201310303258.4; 9 pages.
Chinese Search Report dated Jan. 26, 2016 corresponding to Chinese Application No. 201310303258.4; 4 pages.
Performance of nanostructure Fe-Ag-ZSM-5 catalysts for the catalytic oxidation of volatile organic compounds: Process optimization using response surface methodology, Azadeh Jodaei, et al, Korean J. Chem.Eng. vol. 8, No. 28, pp. 1665-1671.
Jodaei, Azadeh et al.; "Performance of nanostructure Fe-Ag-ZSM-5 catalysts for the catalytic oxidation of volatile organic compounds: Process optimization using response surface methodology"; Korean J. Chem. Eng. 28 (8); 2011, pp. 1665-1671.
International Search Report dated Oct. 22, 2014 from corresponding PCT/CN2014/082463, 5 pages.
Written Opinion dated Oct. 22, 2014 from corresponding PCT/CN2014/082463, 4 pages.
Chinese Search Report dated Dec. 16, 2015 from corresponding Chinese Patent Application No. 201310302954.3, 4 pages.
Chinese First Notification of Office Action dated Dec. 30, 2015 from corresponding Chinese Patent Application No. 201310302954.3, 9 pages.
Canadian Office Action dated Nov. 22, 2017 for Canadian application No. 2,917,361.

* cited by examiner

FE-BASED HYDROGENATION CATALYST AND USE THEREOF

CROSS REFERENCE TO RELATED APPLICATIONS

This application is a National Stage of International Application No. PCT/CN2014/082463, filed Jul. 18, 2014, that claims the benefit of Chinese Patent Application No. 201310303258.4, filed Jul. 18, 2013, and Chinese Patent Application No. 20130302954.3 filed on Jul. 18, 2013. The entire contents of International Application No. PCT/CN2014/082463, filed Jul. 18, 2014, and Chinese Patent Application No. 201310303258.4, filed Jul. 18, 2013, and Chinese Patent Application No. 20130302954.3 filed on Jul. 18, 2013, are incorporated herein by reference.

BACKGROUND OF THE DISCLOSURE

1. Field of the Disclosure

The present invention relates to a Fe-based hydrogenation catalyst and use thereof, which belongs to a technique of hydrogenation catalyst in the field of petroleum refining.

2. Description of the Related Art

A hydrogenation process has existed for a time duration of almost one century since the first set of techniques worldwide, referred to as "classical hydrogenation", was put into industrialization in Germany at 1926. Especially, the hydrogenation, as one important means for the productive gasoline, diesel and other high-grade middle distillate, has attracted a lot of attention and been largely developed over the last 50 years, during which many new hydrogenation catalysts and methods for preparing the same have emerged successively.

U.S. Pat. No. 3,779,903 discloses a hydrogenation catalyst, having tungsten oxide as the main active component, nickel oxide as the co-active component and fluorine as an additive, prepared by impregnation a nickel salt and a tungsten salt onto a special carrier which is produced by a dried and calcinated aluminium oxide sol, and further drying and calcinating it. U.S. Pat. No. 4,330,395 discloses a method for preparing a hydrogenation catalyst by impregnation a nickel salt onto a carrier which is produced by taking an aluminium compound and a tungsten compound as raw materials; the resultant catalyst can be activated by using a sulfur compound and a fluorine compound before use, which can achieve a good effect for middle distillate hydrogenation treatment. CN 101439289A discloses to produce a nickel (cobalt) molybdate- or nickel (cobalt) tungstate-based compound from a metal active component by using a method of in-situ reaction in pores of a carrier with urea or ammonia as a reaction promoter, so that the reaction between the metal and carrier can be prevented, the active component can be more easily to be sulfided, and the activity of the hydrogenation catalyst can be improved.

Since the carriers in the conventional supported catalysts including the above-mentioned hydrogenation catalysts in the prior art have no or little activity and account for a large proportion, it is difficult for the supported catalysts to have a catalytic activity that satisfies the requirements for producing a diesel with ultra-low sulfur content. Thus, a bulk catalyst (non-supported catalyst) has been developed in recent years, in which oxides or sulfides of nickel, cobalt, tungsten or molybdenum containing pore structures themselves are directly used as a main component, instead of using the carriers essential for the conventional hydrogenation catalysts. U.S. Pat. No. 6,582,590 discloses a method for preparing a bulk hydrogenation catalyst by a direct precipitation process, comprising dissolving a soluble molybdate salt and a tungstate salt into water and mixing the solution with an alkaline solution, then dissolving a soluble nickel salt into water and keeping it at 90° C., subsequently adding thereto the alkaline solution of molybdate salt and a tungstate salt at a given rate, and finally subjecting to filtration and drying to produce the bulk hydrogenation catalyst. U.S. Pat. Nos. 6,712,955, 6,156,695 and 6,783,663 also disclose similar methods for preparing bulk hydrogenation catalysts; in all of these techniques, one or a combination of two of cobalt and nickel from VIII group and molybdenum and tungsten from VIB group is used as the active metal component. CN 101255356A also discloses a method for preparing a Ni(Co)—W(Mo) bulk catalyst having nanopores and high specific surface area themselves via a urea melting reaction, and the catalyst produced by the method has a good activity for hydrogenation treatment.

In the other aspect, as the production of heavy oils and the heavy components in the crude oil are increasingly larger, the hydrogenation, as one important means for processing heavy oils, has attracted more and more attention and been developed increasingly. In recent years, many new hydrogenation catalysts for heavy oils and methods for preparing the same have emerged successively in the concerns and studies in the art.

CN 1086534A discloses a hydro-denitrification catalyst for heavy oils and the method for producing the same. The catalyst has a composition of W—Mo—Ni/$SiO_2$—$B_2O_3$—$Al_2O_3$. CN 1458236A discloses a hydro-demetalization and desulfurization catalyst for heavy oils, which has an active component comprising 1 wt %-20 wt % of tungsten oxide and/or molybdenum oxide and 0.5 wt %-5.0 wt % of nickel oxide and/or cobalt oxide, and an aid comprising 0.1 wt %-3.0 wt % of alkali metal and/or alkaline earth metal oxide. The catalyst as produced by this method has both high demetalization activity and high desulfurization activity, and has a high stability for activity, especially a good stability for desulfurization activity. CN 1110304A discloses a hydrogenation catalyst for heavy oils which supports elements of molybdenum, nickel and phosphorus with an alumina containing silicon and phosphorus as the carrier. The catalyst contains 10-30 wt % $MoO_3$, 2-6 wt % NiO and 2-6 wt % P, and exhibits a good denitrification property. U.S. Pat. No. 727,980 discloses a hydro-demetalization catalyst and a method for preparing the same; the catalyst is a finished product having two types of crystalline phases, as obtained by using sintered oxides ($Al_2O_3$, $SiO_2$, $TiO_2$ or a mixture thereof) as a carrier, and firstly impregnation it into a solution of ferric nitrate, then subjecting to drying and calcination before impregnation into a solution of ammonium molybdate, subsequently further subjecting it to drying and calcination. Although the catalyst has a high metal content and a high activity for hydrogenation, it has disadvantages such as a complex preparation process and a high price.

Moreover, during the hydrogenation treatment for heavy oils, since heavy oils have a high viscosity and a high impurity content, the space velocity in the hydrogenation treatment for heavy oils is low, resulting in a large increased usage amount of catalyst as compared to the other oil refining process. Also, the catalyst in the hydrogenation treatment for heavy oils has a short lifetime and a poor reproducibility, thus it is particularly important to reduce the cost for the catalyst. The current approaches for reducing the cost of the hydrogenation catalyst for heavy oils are generally to employ inexpensive carriers or to use preparation methods which are simple and easy to carry out. CN 102039140A discloses a hydrogenation catalyst for heavy oils and a method for preparing the same, comprising mainly using inexpensive natural clays such as kaolin, montmorillonoid, diatomite and natural carclazyte as a part of the carrier. The clays accounts for, in terms of amount of $SiO_2$, 0.5-30 wt % of the weight of the catalyst, and the resultant catalyst has not only a hydrogenation activity comparable to the carriers made from pure alumina, but also an advantage of low price. CN 1289821A discloses a highly-active hydroconversion catalyst for residue oil and a method for preparing the same. The preparation of the catalyst involves using a complete kneading method where a dry aluminium hydroxide glue powder is mixed with a molecular sieve according to a certain ratio, with titanium as an aid, next is added with an alkaline solution of a metal from VIB group and then is added with an acidic solution of a metal from VIII group and/or VIB group. The catalyst has a pore volume of 0.36-0.60 mL/g and a specific surface area of 190-280 $m^2/g$. Since a preparation process of mixing-kneading, which is simple and easy to carry out, is employed in the method, the cost is lower than the impregnation method and the precipitation method.

Seen as such, the researchers has made intensive research, over the years, on the carriers of the supported catalysts for gasoline and diesel as well as heavy oils, the modification by aids and the preparation of the breakthrough bulk catalysts as present in the recent years, and meanwhile has also paid a lot of effort to reduce the cost for preparing the catalysts. However, it is still limited to the basic combination of molybdenum, tungsten as the main active metal component with nickel, cobalt as the aid. Moreover, all of the above preparation methods in the prior art have a common disadvantage of high cost, for which the primary cause is that nickel, cobalt, molybdenum and tungsten, as the active metals, are not abundant in the earth's crust and thus have high prices.

In conclusion, it is still one of the problems, which are urgent to be solved in this field, to develop a low-cost hydrogenation catalyst for gasoline and diesel as well as heavy oils.

SUMMARY OF THE DISCLOSURE

In order to solve the above technical problem, the present invention has an objective to provide a Fe-based hydrogenation catalyst which is suitable for gasoline, diesel, heavy oils and the like, and use thereof. The Fe-based hydrogenation catalyst in the present invention has Fe as the primary active metal component and zinc and potassium as the first co-active metal component, thus has advantages such as low cost and simple fabricating process.

In order to achieve the above objective, the present invention provides a Fe-based hydrogenation catalyst having a Fe-based hydrogenation catalyst as a primary active metal component, and zinc and potassium as a first co-active metal component (also referred as a first co-active element component), in which, based on the total weight of the Fe-based hydrogenation catalyst, a total amount of the primary active metal component and co-active element components is 5-100%, with the balance being a binder or carrier, in terms of oxides, and the co-active element components comprise the first co-active metal component, wherein, the molar ratio of the primary active metal component to the first co-active metal component is 0.5-200:1 (preferably 0.8-20:1).

According to a specific embodiment of the present invention, preferably, the Fe-based hydrogenation catalyst further comprises a second co-active element component selected from Groups IVB, VA, VB, VIB and VIII elements, wherein Group IVB element is preferably titanium or zirconium, Group VA element is preferably phosphorus, Group VB element is preferably vanadium, Group VIB element is preferably chromium, and Group VIII element is preferably cobalt, nickel, palladium or platinum; the molar ratio of the primary active metal component to the second co-active element component is 0.5-200:1, preferably 5-100:1; and based on the total weight of the Fe-based hydrogenation catalyst, the total amount of the primary active metal component and co-active element components is 5-100%, with the balance being a binder or carrier, in terms of oxides, and the co-active element components comprise the first co-active metal component and the second co-active element component.

Well-known measurements and calculation methods in the art can be used for the measurement and calculation for the total contents of the primary active metal component or co-active element (metal) components, each of which are calculated in terms of oxides.

The above Fe-based hydrogenation catalyst as provided in the present invention can be composed of only the primary active metal component and co-active element components (which can be the first co-active metal component alone, or the combination of the first co-active metal component and the second co-active element component), without the binder and carrier, that is, a case where the total amount of the primary active metal component and co-active element components is 100%. A Fe-based hydrogenation catalyst having such a composition can be manufactured by a tabletting process, in which the primary active metal component and co-active element components are mixed, and then subjected directly to tabletting.

The Fe-based hydrogenation catalyst can also be composed of such three parts as a primary active metal component, co-active element components, and a binder or carrier. The Fe-based hydrogenation catalyst using a binder can be prepared by a coprecipitation process, while the Fe-based hydrogenation catalyst using a carrier can be prepared by a impregnation process. As for the Fe-based hydrogenation catalyst having such a composition, preferably, based on the total weight of the Fe-based hydrogenation catalyst, the total amount of the primary active metal component and co-active element components is 20-70% (more preferably 20-50%), with the balance being a binder or carrier, in terms of oxides, and the co-active element components comprise the first co-active metal component or a combination of the first co-active metal component and the second co-active element component.

According to a specific embodiment of the present invention, preferably, the Fe-based hydrogenation catalyst is prepared by a impregnation process, a coprecipitation process or a tabletting process.

According to a specific embodiment of the present invention, preferably, the impregnation process comprises steps of:

dissolving a salt of the primary active metal component and a salt of the first co-active metal component into deionized water to form a impregnation solution;

adding the impregnation solution in a carrier to obtain a semi-finished catalyst product; and leaving the semi-finished catalyst product still in air for 2-24 hours, then baking it to dryness, and further calcinating it in air atmosphere at 200-800° C. for 2-8 h to obtain the Fe-based hydrogenation catalyst.

In the impregnation process, preferably, when the Fe-based hydrogenation catalyst contains a second co-active element component, a salt of the second co-active element component is dissolved into deionized water together with the salt of the primary active metal component and the salt of the first co-active metal component.

In the impregnation process, preferably, the impregnation solution has a volume which is identical to the saturated water absorption capacity of the carrier.

In the impregnation process, preferably, the baking to dryness of the semi-finished catalyst product is performed in an oven at 120° C.

In the impregnation process, preferably, the temperature is elevated at a rate of 5° C./min during the calcination of the semi-finished catalyst product.

According to a specific embodiment of the present invention, preferably, the carrier as used includes one of pyrite ($FeS_2$), pyrrhotite ($Fe_{1-x}S$), ferric oxide, ferroferric oxide, alumina, silica, amorphous aluminosilicate, zeolite molecular sieve and so on, or combination of more than one members thereof.

According to a specific embodiment of the present invention, preferably, the coprecipitation process comprises steps of:

mixing uniformly an aqueous solution of a salt of the primary active metal component and a salt of the first co-active element component with an aqueous solution of a precipitant;

subsequently stirring and reacting the mixture in a water bath at 40-95° C. for 1-24 hours, and then leaving the resultant still for aging in a water bath at 40-95° C. for 2-48 hours to obtain a precipitate;

subjecting the precipitate to filtration, water-washing and baking to dryness, to obtain a catalyst precursor;

calcinating the catalyst precursor in air atmosphere at 200-800° C. for 2-8 hours to obtain a metal oxide; and mixing the metal oxide and a binder, and subjecting the mixture to a molding process to obtain the Fe-based hydrogenation catalyst.

In the coprecipitation process, preferably, when the Fe-based hydrogenation catalyst contains a second co-active element component, a salt of the second co-active element component, together with the salt of the primary active metal component and the salt of the first co-active metal component, is mixed with the aqueous solution of the precipitant.

In the coprecipitation process, preferably, the molding process may be an extrusion molding as strip or kneading molding process. During the molding process, sesbania powders etc. as commonly used may be employed as an extrusion aid, and citric acid, acetic acid, nitric acid and so on may be used as a peptizer, which are mixed with the metal oxides and binders before subjecting to a molding operation such as extrusion as strip or kneading.

According to a specific embodiment of the present invention, preferably, the coprecipitation process further comprises a step of further calcinating the Fe-based hydrogenation catalyst as obtained through the molding process; more preferably, the temperature is elevated at a heating rate of 5° C./min, and the calcination is carried out in air atmosphere at 200-800° C. for 2-8 hours.

According to a specific embodiment of the present invention, preferably, the binder as used in the Fe-based hydrogenation catalyst in the present invention includes one of alumina, silica sol, alumina sol, water glass and so on, or combination of more than one members thereof. The amount of the binder as used can be determined according to the composition of the Fe-based hydrogenation catalyst, and generally can be controlled within a range of 10%-95% based on the total weight of the Fe-based hydrogenation catalyst.

In the coprecipitation process, after the precipitate is subjected to filtration, water-washing and baking to dryness, when necessary, it may be further crushed before calcinating the catalyst precursor as obtained.

In the coprecipitation process, preferably, baking the precipitate to dryness is carried out in an oven at 120° C.

In the coprecipitation process, preferably, the temperature is elevated at a heating rate of 5° C./min during the calcination of the catalyst precursor.

In the coprecipitation process, preferably, the precipitant includes one of NaOH, KOH, $Na_2CO_3$, $K_2CO_3$, $Na_2S$, $(NH_4)_2S$, urea, ammonia and so on, or combination of more than one members thereof. The molar ratio of the precipitant to the primary active metal component, the first co-active metal component, the second co-active element component, that is a molar ratio between the molar amount of the precipitant and the molar amount of the three components, is 1-6:1. When ammonia water is used as the precipitant, it can be used directly without formulation of an aqueous solution of the precipitant.

In the coprecipitation process, the concentration of the aqueous solution of the salt of the primary active metal component and the salt of the co-active element components and the concentration of the aqueous solution of the precipitant can be conventionally controlled and adjusted by a person skilled in the art, provided that the above relationship of ratio can be satisfied and the reaction can be performed smoothly.

Moreover, the aqueous solution of the salt of the primary active metal component and the salt of the co-active element components may be an aqueous solution obtained by dissolving the salt of the primary active metal component and the salt of the co-active element components in deionized water respectively and then mixing the resultant, or an aqueous solution obtained by dissolving the salt of the primary active metal component and the salt of the co-active element components in deionized water simultaneously. The specific operation of mixing uniformly the aqueous solution of the salt of the primary active metal component and the salt of the co-active element components and the aqueous solution of the precipitant may include adding the aqueous solution of the precipitant into the aqueous solution of the salt of the primary active metal component and the salt of the co-active element components, and stirring them uniformly.

According to a specific embodiment of the present invention, preferably, the tabletting process comprises steps of:

mixing uniformly a salt of the primary active metal component and a salt of the first co-active metal component, then baking the mixture to dryness, and further calcinating the resultant in air atmosphere at 200-800° C. for 2-8 h to obtain a powder of oxides of the Fe-based hydrogenation catalyst; and placing the powder of oxides of the Fe-based hydrogenation catalyst into a tablet machine tabletting, to obtain the Fe-based hydrogenation catalyst.

In the tabletting process, preferably, when the Fe-based hydrogenation catalyst contains a second co-active element component, a salt of the second co-active element component is mixed together with the salt of the primary active metal component and the salt of the first co-active metal component.

In the impregnation process, coprecipitation process and tabletting process, preferably, the salt of the primary active metal component includes one of ferric nitrate, ferric sulfate, ferric chloride, ferric phosphate and so on, or combination of more than one members thereof.

In the impregnation process, coprecipitation process and tabletting process, preferably, the salt of the first co-active metal component includes one of nitrate, sulfate, chloride, phosphate and so on, or combination of more than one members thereof.

In the impregnation process, coprecipitation process and tabletting process, preferably, the salt of the second co-active element component includes one of nitrate, sulfate, chloride, phosphate and so on, or combination of more than one members thereof.

The present invention also provides use of the Fe-based hydrogenation catalyst for gasoline, diesel and heavy oil in hydrogenation process for one of straight-run gasoline, straight-run diesel, coker gasoline, coker diesel, catalytic cracking gasoline, catalytic cracking diesel, atmospheric residue oil, vacuum residue oil, coal tar, deasphalted oil and heavy oils extracted from oil sand or shale, or mixed oils thereof. The hydrogenation process may include hydro-desulfurization, hydro-denitrification, hydro-saturation for aromatic hydrocarbon, hydro-demetalization and so on.

After being prepared by the impregnation process, coprecipitation process or tabletting process, the Fe-based hydrogenation catalyst in the present invention can attain a high activity upon a sulfurization process. The sulfurization process may be carried out by using common sulfurization techniques for a hydrogenation catalyst in the art, and the applicable sulfurizing oil or sulfurizing agent may be a sulfurizing oil or sulfurizing agent commonly used in the art. The sulfurization process may have a temperature of 200-450° C., a pressure of 0.1-10 MPa, a time duration of 2-48 hours, a liquid hourly space velocity of 0.1-20 $h^{-1}$ and a hydrogen-to-oil volume ratio of 100-800; preferably, the sulfurization process may have a temperature of 280-380° C., a pressure of 2-6 MPa, a time duration of 6-24 hours, a liquid hourly space velocity of 1-4 $h^{-1}$ and a hydrogen-to-oil volume ratio of 200-500.

Before the sulfurization process, the primary active metal component, the first co-active metal component and the second co-active element component in the Fe-based hydrogenation catalyst in the present invention are present in form of oxides, which will turn into a form of sulfides upon the sulfurization process.

In the above use, preferably, the hydrogenation process has a temperature of 200-600° C., a pressure of 1-20 MPa, a liquid hourly space velocity of 0.1-10 $h^{-1}$ and a hydrogen-to-oil volume ratio of 100-2000; preferably, the hydrogenation process may have a temperature of 250-400° C., a pressure of 2-10 MPa, a liquid hourly space velocity of 0.5-8 $h^{-1}$ and a hydrogen-to-oil volume ratio of 200-1000.

In the above use, the apparatuses and methods for the hydrogenation process may be conventional apparatuses and methods as well as technological processes in the hydrogenation for gasoline, diesel and heavy oils in the art. The hydrogenation process may be carried out in one reactor, or may be carried out in a plurality of reactors in parallel or in series; that is to say, the hydrogenation process may be carried out by charging the catalyst in the present invention into one or more reactors of one set of procedures. Without changing the current technological process of the hydrogenation for gasoline, diesel and heavy oils, the catalyst in the present invention has a good hydrogenation effect.

The Fe-based hydrogenation catalyst provided in the present invention uses Fe as a primary active metal component, with zinc and potassium as a first co-active metal component, and may comprise a second co-active element component selected from Group IVB, Group VA, Group VB, Group VIB and Group VIII elements. The method for preparing the same is well-developed and simple to carry out.

The present invention utilizes, for the first time, a Fe-based catalyst as the hydrogenation catalyst for gasoline, diesel and heavy oils, instead of the conventional hydrogenation catalysts for hydrogenating gasoline, diesel and heavy oils which contain molybdenum, tungsten from Group VIB as the active metal component and cobalt, nickel from Group VIII as the co-active metal. As compared to the conventional hydrogenation catalysts for gasoline, diesel and heavy oils, the Fe-based catalyst in the present invention has advantages such as inexpensive and readily available raw materials and simple preparation processes, and also has higher hydrogenation activity for gasoline, diesel and heavy oils while being capable of largely lowering the production cost of the hydrogenation catalysts.

The Fe-based hydrogenation catalyst in present invention overcomes the problem of limiting to the active metal components as used over decades for the conventional hydrogenation catalyst, thus has long-term values for industrial application.

DETAILS DESCRIPTION OF THE DISCLOSURE

Hereinafter, the technical solutions and effects are further explained in detail by reference to Examples, which should not be construed as limitations to the implementable scope of the present invention.

Example 1

This Example provides a Fe-based hydrogenation catalyst for gasoline and diesel, which is prepared by using a impregnation process comprising steps of:

dissolving 15.18 g of ferric nitrate, 3.65 g of zinc nitrate and 0.05 g of potassium nitrate into 10 mL of deionized water to formulate a impregnation solution;

adding the impregnation solution dropwise into 10 g of an extrusion-molded alumina strip having a diameter of 1.5 mm to obtain a semi-finished catalyst product; and leaving the semi-finished catalyst product still in air for 20 hours, then baking it to dryness in an oven at 120° C., subsequently elevating the temperature at a rate of 5° C./min and calcinating it in air atmosphere at 500° C. for 4 hours, to obtain the Fe-based hydrogenation catalyst for gasoline and diesel, FZ-1.

The catalyst FZ-1 is measured to have a total amount of 26% for oxide of Fe—Zn—K, based on the total weight of the catalyst FZ-1.

Example 2

This Example provides a Fe-based hydrogenation catalyst for gasoline and diesel, which is prepared by using a coprecipitation process comprising steps of:

dissolving 32.44 g of ferric chloride and 6.82 g of zinc chloride into 250 mL of deionized water to obtain an aqueous solution of ferric chloride and zinc chloride; dissolving 8 g of potassium hydroxide into 80 mL of deionized water to obtain a solution of potassium hydroxide; adding the solution of potassium hydroxide slowly into the aqueous solution of ferric chloride and zinc chloride while stirring;

stirring and reacting the resultant for 4 hours in a water bath at 80° C., and then lowering the temperature to 60° C. and leaving it still for aging for 24 hour to obtain a precipitate;

subjecting the precipitate to filtration before it cools, washing it by deionized water to pH of about 9 and baking it to dryness in an oven at 120° C., subsequently elevating the temperature at a rate of 5° C./min and calcinating it in air atmosphere at 500° C. for 2 hours to obtain an oxide of Fe—Zn—K; and mixing 4.5 g of the oxide of Fe—Zn—K, 10 g of pseudo-boehmite as a binder and 0.4 g of sesbania powder into a uniform powder, to obtain a mixed powder; dissolving 0.3 g of citric acid and 0.3 g of nitric acid into 10 mL deionized water to form a peptizer; adding the peptizer into the mixed powder and kneading them sufficiently to extrude them on a extruder into strips having a diameter of 1.5 mm; and baking the strips to dryness in an oven at 120° C. and then calcinating it in air atmosphere at 500° C. for 6 hours to obtain the Fe-based hydrogenation catalyst for gasoline and diesel, FZ-2.

The catalyst FZ-2 is measured to have a total amount of 31% for oxide of Fe—Zn—K, based on the total weight of the catalyst FZ-2.

Example 3

This Example provides a Fe-based hydrogenation catalyst for gasoline and diesel, which is prepared by using a impregnation process comprising steps of:

dissolving 14.56 g of ferric sulfate, 4.78 g of zinc nitrate, 0.04 g of potassium nitrate and 0.08 g of phosphoric acid into 10 mL of deionized water to formulate a impregnation solution;

adding the impregnation solution dropwise into 10 g of an extrusion-molded alumina strip having a diameter of 1.5 mm to obtain a semi-finished catalyst product; and leaving the semi-finished catalyst product still in air for 16 hours, then baking it to dryness in an oven at 120° C., subsequently elevating the temperature at a rate of 5° C./min and calcinating it in air atmosphere at 500° C. for 8 hours, to obtain the Fe-based hydrogenation catalyst for gasoline and diesel, FZ-3.

The catalyst FZ-3 is measured to have a total amount of 30% for oxide of Fe—Zn—K—P, based on the total weight of the catalyst FZ-3.

Example 4

This Example provides a Fe-based hydrogenation catalyst for gasoline and diesel, which is prepared by using a impregnation process comprising steps of:

dissolving 13.98 g of ferric phosphate, 6.65 g of zinc chloride, 0.09 g of potassium nitrate and 0.35 g of ammonium metavanadate into 10 mL of deionized water to formulate a impregnation solution;

adding the impregnation solution dropwise into 10 g of an extrusion-molded alumina strip having a diameter of 1.5 mm to obtain a semi-finished catalyst product; and leaving the semi-finished catalyst product still in air for 2-24 hours, then baking it to dryness in an oven at 120° C., subsequently elevating the temperature at a rate of 5° C./min and calcinating it in air atmosphere at 500° C. for 4 hours, to obtain the Fe-based hydrogenation catalyst for gasoline and diesel, FZ-4.

The catalyst FZ-4 is measured to have a total amount of 31% for oxide of Fe—Zn—K—V—P, based on the total weight of the catalyst FZ-4.

Example 5

This Example provides a hydrogenation catalyst for gasoline and diesel, as a reference catalyst 1, which is prepared by a process comprising steps of:

dissolving 4.74 g of ammonium metatungstate and 2.26 g of nickel nitrate into 10 mL of deionized water to formulate a impregnation solution;

adding the impregnation solution dropwise into 10 g of an extrusion-molded alumina strip having a diameter of 1.5 mm to obtain a semi-finished catalyst product; and leaving the semi-finished catalyst product still in air for 2-24 hours, then baking it to dryness in an oven at 120° C., subsequently elevating the temperature at a rate of 5° C./min and calcinating it in air atmosphere at 500° C. for 4 hours, to obtain the reference catalyst 1.

The reference catalyst 1 is measured to have a content of tungsten oxide of 27% and a content of nickel oxide of 4%, based on the total weight of the reference catalyst 1.

Example 6

This Example provides a hydrogenation catalyst for gasoline and diesel, as a reference catalyst 2, which is prepared by a process comprising steps of:

dissolving 20.05 g of ferric nitrate into 10 mL of deionized water to formulate a impregnation solution;

adding the impregnation solution dropwise into 10 g of an extrusion-molded alumina strip having a diameter of 1.5 mm to obtain a semi-finished catalyst product; and leaving the semi-finished catalyst product still in air for 14 hours, then baking it to dryness in an oven at 120° C., subsequently elevating the temperature at a rate of 5° C./min and calcinating it in air atmosphere at 500° C. for 8 hours, to obtain the reference catalyst 2.

The reference catalyst 2 is measured to have a content of Fe oxides of 31%, based on the total weight of the reference catalyst 2.

Example 7

This Example provides a hydrogenation catalyst for gasoline and diesel, as a reference catalyst 3, which is prepared by a process comprising steps of:

dissolving 14.56 g of ferric sulfate and 4.78 g of zinc nitrate into 10 mL of deionized water to formulate a impregnation solution;

adding the impregnation solution dropwise into 10 g of an extrusion-molded alumina strip having a diameter of 1.5 mm to obtain a semi-finished catalyst product; and leaving the semi-finished catalyst product still in air for 24 hours, then baking it to dryness in an oven at 120° C., subsequently elevating the temperature at a rate of 5° C./min and calcinating it in air atmosphere at 500° C. for 2 hours, to obtain the reference catalyst 3.

The reference catalyst 3 is measured to have a content of Fe oxide of 28%, based on the total weight of the reference catalyst 3.

Example 8

This Example provides use of the catalysts in Examples 1-7 in the hydrogenation process of coker diesel.

Each of the catalysts in Examples 1-7 is subjected to a sulfurization process before use, allowing it to have hydrogenation activity. The sulfurization process is a wet in-situ sulfurization process carried out by a 10 mL hydrogenation micro reactor at high-temperature and high-pressure, in which a wet sulfurization is applied, and after the sulfurization a hydrogenation reaction continues in the reactor without discharging the catalysts. The sulfurizing oil is a solution containing 5 wt % $CS_2$ in n-decane. The sulfurization process has a temperature of 300° C., a time duration of 6 h, a pressure of 4 MPa, a liquid hourly space velocity of 1.5 $h^{-1}$, and a hydrogen-to-oil volume ratio of 300.

The hydrogenation process in this Example is carried out using a 10 mL hydrogenation micro reactor at high-temperature and high-pressure, and a coker diesel from Daqing (Heilongjiang Province, China), having a specific gravity) ($d_4^{20}$) of 0.8196, a sulfur content of 1256 ppm and a total nitrogen content of 745 ppm, is used as raw material for evaluation. The raw material is pumped in using a plunger pump, and the oil sample after reaction is cooled by a higher separator, then collected and analyzed at a lower separator. The hydrogenation process has a temperature of 360° C., a pressure of 6 MPa, a liquid hourly space velocity of 1.0 $h^{-1}$, and a hydrogen-to-oil volume ratio of 800. The evaluation result of the catalyst obtained from the hydrogenation process is shown in Table 1 as below.

Example 9

This Example provides use of the catalysts in Examples 1-7 in the hydrogenation process of catalytic cracking diesel.

Each of the catalysts in Examples 1-7 is subjected to a sulfurization process before use, allowing it to have hydrogenation activity. The sulfurization process is a wet in-situ sulfurization process carried out by a 10 mL hydrogenation micro reactor at high-temperature and high-pressure, in which a wet sulfurization is applied, and after the sulfurization a hydrogenation reaction continues in the reactor without discharging the catalysts. The sulfurizing oil is a solution containing 5 wt % $CS_2$ in n-decane. The sulfurization process has a temperature of 300° C., a time duration of 10 h, a pressure of 4 MPa, a liquid hourly space velocity of 1.5 $h^{-1}$, and a hydrogen-to-oil volume ratio of 300.

The hydrogenation process in this Example is carried out using a 10 mL hydrogenation micro reactor at high-temperature and high-pressure, and a catalytic cracking diesel from Daqing (Heilongfiang Province, China), having a specific gravity ($d_4^{20}$) of 0.8796, a sulfur content of 890 ppm, a total nitrogen content of 920 ppm and a total aromatic hydrocarbon content of 55.2 v %, is used as raw material for evaluation. The raw material is pumped in using a plunger pump, and the oil sample after reaction is cooled by a higher separator, then collected and analyzed at a lower separator. The hydrogenation process has a temperature of 400° C., a pressure of 6 MPa, a liquid hourly space velocity of 1.0 $h^{-1}$, and a hydrogen-to-oil volume ratio of 800. The evaluation result of the catalysts obtained from the hydrogenation process is shown in Table 2 as below.

TABLE 1

| Catalysts | HDS, % | HDN, % |
| --- | --- | --- |
| FZ-1 | 83.0 | 69.4 |
| FZ-2 | 81.2 | 71.2 |
| FZ-3 | 84.5 | 70.8 |
| FZ-4 | 87.2 | 72.1 |
| Reference catalyst 1 | 98.5 | 85.6 |
| Reference catalyst 2 | 10.1 | 5.0 |
| Reference catalyst 3 | 70.2 | 68.0 |

TABLE 2

| Catalysts | HDS, % | HDN, % | HDA, % |
| --- | --- | --- | --- |
| FZ-1 | 81.0 | 61.6 | 45.4 |
| FZ-2 | 78.7 | 59.2 | 43.1 |
| FZ-3 | 82.3 | 60.4 | 44.9 |
| FZ-4 | 84.6 | 58.1 | 43.2 |
| Reference catalyst 1 | 93.9 | 72.3 | 58.8 |
| Reference catalyst 2 | 8.4 | 5.1 | 6.2 |
| Reference catalyst 3 | 65.2 | 55.1 | 40.1 |

Example 10

This Example provides use of the catalysts in Examples 1-7 in the hydrogenation process of full-fraction FCC gasoline.

Each of the catalysts in Examples 1-7 is subjected to a sulfurization process before use, allowing it to have hydrogenation activity. The sulfurization process is a wet in-situ sulfurization process carried out by a 10 mL hydrogenation micro reactor at high-temperature and high-pressure, in which a wet sulfurization is applied, and after the sulfurization a hydrogenation reaction continues in the reactor without discharging the catalysts. The sulfurizing oil is a solution containing 5 wt % $CS_2$ in n-decane. The sulfurization process has a temperature of 300° C., a time duration of 6 h, a pressure of 2 MPa, a liquid hourly space velocity of 1.5 $h^{-1}$, and a hydrogen-to-oil volume ratio of 300.

The hydrogenation process in this Example is carried out using a 10 mL hydrogenation micro reactor at high-temperature and high-pressure, and a full-fraction FCC gasoline, having a specific gravity ($d_4^{20}$) of 0.7296, a sulfur content of 470 ppm and a research octane number (RON) of 92.0, is used as raw material for evaluation. The raw material is pumped in using a plunger pump, and the oil sample after the reaction is cooled by a higher separator, then collected and analyzed at a lower separator. The hydrogenation process has a temperature of 280° C., a pressure of 4 MPa, a liquid hourly space velocity of 1.0 $h^{-1}$, and a hydrogen-to-oil volume ratio of 300. The evaluation result of the catalysts obtained from the hydrogenation process is shown in Table 3 as below.

TABLE 3

| Catalysts | HDS, % | RON | Yield of gasoline, % |
| --- | --- | --- | --- |
| FZ-1 | 80.5 | 91 | 99.1 |
| FZ-2 | 77.2 | 91 | 99.2 |
| FZ-3 | 81.5 | 92 | 98.3 |
| FZ-4 | 82.1 | 90 | 97.2 |
| Reference catalyst 1 | 94 | 90 | 99.3 |
| Reference catalyst 2 | 12.3 | 92 | 99.0 |
| Reference catalyst 3 | 62.1 | 92 | 98.1 |

In above Examples, the methods for measurement and calculation of the HDS rate, HDN rate and HDA rate of the catalysts, and RON of oils and yield of gasoline are those well-known in the art.

The results in Tables 1, 2 and 3 show that the Fe-based hydrogenation catalysts provided in the present invention has high hydro-desulfurization, -denitrification and -dearomatization activities, as compared with the reference catalysts. Moreover, when the Fe-based hydrogenation catalysts in the present invention are used in the hydrogenation of gasoline, it can cause little loss of the octane number of gasoline.

The Fe-based hydrogenation catalysts provided in Examples of the present invention are characterized by incorporating more co-active element components. Moreover, as compared to the reference catalyst 2 in which no co-active element components are incorporated, the catalyst (reference catalyst 3) having zinc incorporated is improved in terms of its hydro-desulfurization, -denitrification and -dearomatization rate, by several to tens of times, and the incorporation of potassium can further improve the hydro-desulfurization activity of the catalyst (reference catalyst 3) having only zinc incorporated.

Although the Fe-based hydrogenation catalysts provided in Examples of the present invention have a HDS, HDN and HDA rate slightly lower than those of the conventional supported Ni—W catalyst (reference catalyst 1), the primary active metal component and co-active element (metal) components as used in the Examples of the present invention have prices much lower than the nickel salt, cobalt salt, tungsten salt, molybdenum salt and so on as used in the conventional hydrogenation catalysts. Furthermore, the Fe-based hydrogenation catalyst provided in Examples of the present invention overcomes the problem of limiting to the active metal components as used over decades for the conventional hydrogenation catalyst for gasoline and diesel, thus has long-term values for industrial application.

Example 11

This Example provides a carrier of Fe-based hydrogenation catalyst for heavy oils, which is prepared by a process comprising steps of:

mixing uniformly 10 g of pseudo-boehmite powder and 0.3 g of sesbania powder to obtain a mixed powder;

dissolving 0.3 g of dilute nitric acid and 0.3 g of citric acid into 20 mL of deionized water to obtain a mixed solution;

dropping the mixed solution slowly into the mixed powder, mixing them uniformly to form a moldable body, and extruding it into a strip having a diameter of 1.2 mm on an extruder; and baking the strip to dry in an oven at 120° C., and then calcinating it in air atmosphere at 500° C. for 4 hours to obtain the catalyst carrier.

Example 12

This Example provides a carrier of Fe-based hydrogenation catalyst for heavy oils, which is prepared by a process comprising steps of:

mixing uniformly 7 g of pseudo-boehmite powder, 3 g of MCM-41 molecular sieve, and 0.3 g of sesbania powder to obtain a mixed powder;

dissolving 0.3 g of dilute nitric acid and 0.3 g of citric acid into 20 mL of deionized water to obtain a mixed solution;

dropping the mixed solution slowly into the mixed powder, mixing them uniformly to form a moldable body, and extruding it into a strip having a diameter of 1.2 mm on an extruder; and baking the strip to dry in an oven at 120° C., and then calcinating it in air atmosphere at 500° C. for 4 hours to obtain the catalyst carrier.

Example 13

This Example provides a Fe-based hydrogenation catalyst for heavy oils, which is prepared by a process comprising steps of:

mixing 29.52 g of ferric nitrate, 6.09 g of zinc nitrate and 0.15 g of potassium nitrate, and then dissolving the mixture into 20 mL of deionized water to form a impregnation solution;

dropping the impregnation solution slowly into 10 g of the catalyst carrier in Example 11, and mixing them uniformly to obtain a semi-finished catalyst product; and leaving the semi-finished catalyst product still at room temperature for 4 hours, then baking it to dry in an oven at 120° C., subsequently calcinating it in air atmosphere at 500° C. for 4 hours, to obtain the Fe-based hydrogenation catalyst for heavy oils, C1.

The Fe-based hydrogenation catalyst for heavy oils, C1, is measured to have a total amount of 40% for oxides of Fe—Zn—K and a balance of macroporous alumina, based on the total weight of the catalyst C1. The data for specific surface area, pore volume and average pore size of the Fe-based hydrogenation catalyst for heavy oils, C1, are shown in Table 5, wherein the methods for measurement and calculation of the specific surface area, pore volume and average pore size of the catalysts are those well-known in the art.

Example 14

This Example provides a Fe-based hydrogenation catalyst for heavy oils, which is prepared by a process comprising steps of:

mixing 25.30 g of ferric sulfate, 12.18 g of zinc chloride, 0.10 g of potassium sulfate and 1.05 g of zirconium nitrate, and then dissolving the mixture into 20 mL of deionized water to form a impregnation solution;

adding the impregnation solution slowly into 10 g of the catalyst carrier in Example 12, and mixing them uniformly to obtain a semi-finished catalyst product; and leaving the semi-finished catalyst product still at room temperature for 4 hours, then baking it to dry in an oven at 120° C., subsequently calcinating it in air atmosphere at 500° C. for 4 hours, to obtain the Fe-based hydrogenation catalyst for heavy oils, C2.

The Fe-based hydrogenation catalyst for heavy oils, C2, is measured to have a total amount of 40% for oxide of Fe—Zn—K—Zr and a balance of macroporous alumina and MCM-41, based on the total weight of the catalyst C2. The data for specific surface area, pore volume and average pore size of the Fe-based hydrogenation catalyst for heavy oils, C2, are shown in Table 5.

Example 15

This Example provides a Fe-based hydrogenation catalyst for heavy oils, which is prepared by a process comprising steps of:

mixing 18.26 g of ferric phosphate, 20.78 g of zinc sulfate, 0.20 g of potassium nitrate and 0.95 g of ammonium metavanadate, and then dissolving the mixture into 20 mL of deionized water to form a impregnation solution;

adding the impregnation solution slowly into 10 g of the catalyst carrier in Example 12, and mixing them uniformly to obtain a semi-finished catalyst product; and leaving the semi-finished catalyst product still at room temperature for 8 hours, then baking it to dry in an oven at 120° C., subsequently calcinating it in air atmosphere at 500° C. for 6 hours, to obtain the Fe-based hydrogenation catalyst for heavy oils, C3.

The Fe-based hydrogenation catalyst for heavy oils, C3, is measured to have a total amount of 40% for oxide of Fe—Zn—K—Zr and a balance of macroporous alumina and MCM-41, based on the total weight of the catalyst C3. The data for specific surface area, pore volume and average pore size of the Fe-based hydrogenation catalyst for heavy oils, C3, are shown in Table 5.

Example 16

This Example provides a Fe-based hydrogenation catalyst for heavy oils, which is prepared by a process comprising steps of:

mixing uniformly 19.80 g of ferric chloride, 14.18 g of zinc nitrate, 0.32 g of potassium sulfate and 1.00 g of titanyl sulfate, and then baking it in an oven at 120° C., subsequently calcinating it in air atmosphere at 500° C. for 4 hours, to obtain a powder of oxides of the Fe-based hydrogenation catalyst for heavy oils, C4; and adding 0.5 g of deionized water into the powder, mixing and then feeding them into a tablet machine for tabletting, to obtain the Fe-based hydrogenation catalyst for heavy oils, C4.

The Fe-based hydrogenation catalyst for heavy oils, C4, has a total amount of Fe—Zn—K—Ti oxide of 100%, based on the total weight of the catalyst C4. The data for specific surface area, pore volume and average pore size of the Fe-based hydrogenation catalyst for heavy oils, C4, is shown in Table 5.

Example 17

This Example provides a Fe-based hydrogenation catalyst for heavy oils, which is prepared by using a coprecipitation process comprising steps of:

dissolving 32.44 g of ferric chloride and 6.82 g of zinc chloride into 250 mL of deionized water to obtain an aqueous solution of ferric chloride and zinc chloride; dissolving 8 g of potassium hydroxide into 80 mL of deionized water to obtain a solution of potassium hydroxide; adding the solution of potassium hydroxide slowly into the aqueous solution of ferric chloride and zinc chloride while stirring;

stirring and reacting the mixture for 4 hours in a water bath at 80° C., and then lowering the temperature to 60° C. and leaving the resultant still for aging for 24 hour to obtain a precipitate;

subjecting the precipitate to filtration when it is warm, washing by deionized water to pH of about 9 and baking it to dry in an oven at 120° C., subsequently elevating the temperature at a rate of 5° C./min and calcinating it in air atmosphere at 500° C. for 2 hours to obtain a Fe—Zn—K oxide; and mixing 6.0 g of the Fe—Zn—K oxide, 10 g of pseudo-boehmite as a binder and 0.4 g of sesbania powder into a uniform powder, to obtain a mixed powder; dissolving 0.3 g of citric acid and 0.3 g of nitric acid into deionized water to form a peptizer; adding the peptizer into the mixed powder and kneading them sufficiently to extrude them on a extruder into strips having a diameter of 1.5 mm; and baking the strips to dry in an oven at 120° C. and then calcinating it in air atmosphere at 500° C. for 8 hours to obtain the Fe-based hydrogenation catalyst for heavy oils, C5.

The catalyst C5 is measured to have a total amount of 40% for the oxide of Fe—Zn—K, based on the total weight of the catalyst C5. The data for specific surface area, pore volume and average pore size of the Fe-based hydrogenation catalyst for heavy oils, C5, are shown in Table 5.

Example 18

This Example provides a reference catalyst, which is prepared by a process comprising steps of:

dissolving 33.73 g of ferric nitrate into 20 mL of deionized water to form a impregnation solution;

dropping the impregnation solution slowly into 10 g of the catalyst carrier in Example 11, and mixing them uniformly to obtain a semi-finished catalyst product; and leaving the semi-finished catalyst product still at room temperature for 4 hours, then baking it to dry in an oven at 120° C., subsequently calcinating it in air atmosphere at 500° C. for 4 hours, to obtain the reference catalyst C6.

The reference catalyst C6 is measured to have a total amount of 40% for Fe oxide and a balance of macroporous alumina, based on the total weight of the catalyst C6. The data for specific surface area, pore volume and average pore size of the reference catalyst C6 are shown in Table 5.

Example 19

This Example provides a reference catalyst, which is prepared by a process comprising steps of:

dissolving 27.62 g of ferric nitrate and 6.78 g of zinc nitrate into 20 mL of deionized water to form a impregnation solution;

dropping the impregnation solution slowly into 10 g of the catalyst carrier in Example 12, and mixing them uniformly to obtain a semi-finished catalyst product; and leaving the semi-finished catalyst product still at room temperature for 4 hours, then baking it to dry in an oven at 120° C., subsequently calcinating it in air atmosphere at 500° C. for 4 hours, to obtain the reference catalyst C7.

The reference catalyst C7 is measured to have a total amount of 40% for oxide of Fe—Zn, and a balance of macroporous alumina and MCM-41, based on the total weight of the catalyst C7. The data for specific surface area, pore volume and average pore size of the reference catalyst C7 are shown in Table 5.

Example 20

This Example provides a reference catalyst, which is prepared by a process comprising steps of:

dissolving 2.27 g of ammonium metatungstate and 2.43 g of nickel nitrate into 20 mL of deionized water to form a impregnation solution;

dropping the impregnation solution slowly into 10 g of the catalyst carrier in Example 12, and mixing them uniformly to obtain a semi-finished catalyst product; and leaving the semi-finished catalyst product still at room temperature for 4 hours, then baking it to dry in an oven at 120° C., subsequently calcinating it in air atmosphere at 500° C. for 4 hours, to obtain the reference catalyst C8.

The reference catalyst C8 is measured to have a total amount of 20% for oxide of W—Ni, and a balance of macroporous alumina and MCM-41, based on the total weight of the catalyst C8. The data for specific surface area, pore volume and average pore size of the reference catalyst C8 are shown in Table 5.

Example 21

This Example provides use of the catalysts in Examples 13-20 in the hydrogenation process of atmospheric residue oil.

Each of the catalysts in Examples 13-20 is subjected to a sulfurization process before use, allowing it to have hydrogenation activity. The sulfurization process is a wet in-situ sulfurization process carried out by a 50 mL hydrogenation micro reactor at high-temperature and high-pressure, in which a wet sulfurization is applied, and after the sulfurization a hydrogenation reaction continues in the reactor without discharging the catalysts. The sulfurizing oil is a solution containing 5 wt % $CS_2$ in n-decane. The sulfurization process has a temperature of 300° C., a time duration of 10 h, a pressure of 4 MPa, a liquid hourly space velocity of 1.5 $h^{-1}$, and a hydrogen-to-oil volume ratio of 300.

The hydrogenation process in this Example is carried out using a 50 mL hydrogenation micro reactor at high-temperature and high-pressure, and an atmospheric residues of Saudi Arabian middle crude oils (of which the properties are shown in table 4) is used as raw material for evaluation. The raw material is pumped in using a plunger pump, and the oil sample after reaction is cooled by a higher separator, then collected and analyzed at a lower separator. The hydrogenation process has a temperature of 400° C., a pressure of 10 MPa, a liquid hourly space velocity of 1.0 $h^{-1}$, and a hydrogen-to-oil volume ratio of 1000. The evaluation result of the catalysts obtained from the hydrogenation process is shown in Table 5 as below.

TABLE 4

| Raw oils | atmospheric residues of Saudi Arabian middle crude oils |
|---|---|
| Density (20° C.), g/cm³ | 0.98 |
| sulphur content, wt % | 3.8 |
| total nitrogen content, wt % | 0.34 |

TABLE 5

| Catalysts | C1 | C2 | C3 | C4 | C5 | C6 | C7 | C8 |
|---|---|---|---|---|---|---|---|---|
| Specific surface area, m²/g | 170 | 315 | 325 | 71 | 102 | 324 | 173 | 357 |
| Pore volume, cc/g | 0.77 | 0.98 | 0.92 | 0.32 | 0.67 | 0.93 | 0.76 | 1.01 |
| Average pore size, nm | 11.9 | 9.0 | 11.4 | 8.0 | 8.2 | 9.4 | 12.3 | 11.1 |
| HDS rate, % | 50.4 | 54.1 | 55.0 | 55.2 | 49.8 | 7.9 | 47.1 | 67.0 |
| HDN rate, % | 31.8 | 32.9 | 34.1 | 33.8 | 31.0 | 5.1 | 30.5 | 40.2 |

Example 22

This Example provides use of the catalysts in Examples 15, 16, 19 and 20 in the hydrogenation process of coker gas oil.

Each of the catalysts in Examples 15, 16, 19 and 20 is subjected to a sulfurization process before use, allowing it to have better hydrogenation effect. The sulfurization process is a wet in-situ sulfurization process carried out by a 50 mL hydrogenation micro reactor at high-temperature and high-pressure, in which a wet sulfurization is applied and after the sulfurization a hydrogenation reaction continues in the reactor without discharging the catalysts. The sulfurizing oil is a solution containing 5 wt % $CS_2$ in n-decane. The sulfurization process has a temperature of 400° C., a time duration of 8 h, a pressure of 5 MPa, a liquid hourly space velocity of 1.5 $h^{-1}$, and a hydrogen-to-oil volume ratio of 300.

The hydrogenation process in this Example is carried out using a 50 mL hydrogenation micro reactor at high-temperature and high-pressure, and a coker gas oil from Dagang (Tianjin, China), having a sulphur content of 0.253 wt % and a total nitrogen content of 0.51 wt %, is used as raw material for evaluation. The raw material is pumped in using a plunger pump, and the oil sample after reaction is cooled by a higher separator, then collected and analyzed at a lower separator. The hydrogenation process has a temperature of 360° C., a pressure of 6 MPa, a liquid hourly space velocity of 1.5 $h^{-1}$, and a hydrogen-to-oil volume ratio of 500.

The evaluation result of the catalysts obtained from the hydrogenation process is shown in Table 6 as below.

TABLE 6

| Catalysts | C3 | C4 | C7 | C8 |
|---|---|---|---|---|
| HDS rate, % | 39.2 | 39.6 | 32.1 | 48.7 |
| HDN rate, % | 30.1 | 31.2 | 30.3 | 36.0 |

Example 23

This Example provides use of the catalysts in Examples 15, 16, 19 and 20 in the hydrogenation process of vacuum residue oil.

Each of the catalysts in Examples 15, 16, 19 and 20 is subjected to a sulfurization process before use, allowing it to have better hydrogenation effect. The sulfurization process is a wet in-situ sulfurization process carried out by a 50 mL hydrogenation micro reactor at high-temperature and high-pressure, in which a wet sulfurization is applied and after the sulfurization a hydrogenation reaction continues in the reactor without discharging the catalysts. The sulfurizing oil is a solution containing 5 wt % $CS_2$ in n-decane. The sulfurization process has a temperature of 360° C., a time duration of 12 h, a pressure of 4 MPa, a liquid hourly space velocity of 2 $h^{-1}$, and a hydrogen-to-oil volume ratio of 300.

The hydrogenation process in this Example is carried out using a 50 mL hydrogenation micro reactor at high-temperature and high-pressure, and a vacuum residues of Saudi Arabian middle crude oils (of which the properties are shown in table 7) is used as raw material for evaluation. The raw material is pumped in using a plunger pump, and the oil sample after reaction is cooled by a higher separator, then collected and analyzed at a lower separator. The hydrogenation process has a temperature of 360° C., a pressure of 8 MPa, a liquid hourly space velocity of 1 $h^{-1}$, and a hydrogen-to-oil volume ratio of 800.

The evaluation result of the catalysts obtained from the hydrogenation process is shown in Table 8 as below.

TABLE 7

| Raw oils | vacuum residues of Saudi Arabian middle crude oils |
|---|---|
| Density (20° C.), g/cm$^3$ | 1.0220 |
| Ni, ppm | 60 |
| V, ppm | 186 |

TABLE 8

| Catalysts | C3 | C4 | C7 | C8 |
|---|---|---|---|---|
| Total demetalization (Ni and V) rate, % | 78 | 81 | 80 | 92 |

The results in Tables 5, 6 and 8 shows that the Fe-based hydrogenation catalysts for heavy oils in Examples of the present invention has very high hydro-desulfurization, -denitrification and -dearomatization activities for heavy oils. The Fe-based hydrogenation catalysts in Examples of the present invention are characterized by incorporating co-active element (metal) components. Moreover, as compared with the reference catalyst C6 in which no co-active element (metal) components are incorporated, the catalyst having zinc incorporated (reference catalyst C7) is improved in terms of its hydro-desulfurization rate, by several times, and the incorporation of potassium can further improve the hydro-desulfurization activity of the catalyst (reference catalyst C7) having only zinc incorporated.

Although the Fe-based hydrogenation catalysts provided in Examples of the present invention have a HDS, HDN and HDA rate slightly lower than those of the conventional supported Ni—W catalyst (reference catalyst C8), the primary active metal component and co-active metal components as used in the Examples of the present invention have prices much lower than the nickel salt, cobalt salt, tungsten salt, molybdenum salt and so on as used in the conventional hydrogenation catalysts. Furthermore, the Fe-based hydrogenation catalyst in Examples of the present invention overcomes the problem of limiting to the active metal components as used over decades for the conventional hydrogenation catalysts, thus has important values for theoretical study and industrial application.

The invention claimed is:

1. A Fe-based hydrogenation catalyst, consisting of:
Fe as a primary active metal component;
zinc and potassium as a first co-active metal component, and
a second co-active element component selected from titanium, zirconium, phosphorus, vanadium, cobalt, nickel, palladium and platinum,
wherein, based on the total weight of the Fe-based hydrogenation catalyst, a total amount of the primary active metal component and co-active element components is 5-100%, with the balance being a binder or carrier, in terms of oxides, and wherein the co-active element components comprise the first co-active metal component and the second co-active element component,
wherein the primary active metal component to the first co-active metal component has a molar ratio that is 0.5-200:1,
wherein the molar ratio of the primary active metal component to the second co-active element component is 0.5-200:1.

2. The Fe-based hydrogenation catalyst according to claim 1, wherein the molar ratio of the primary active metal component to the first co-active metal component is 0.8-20:1.

3. The Fe-based hydrogenation catalyst according to claim 1, wherein, based on the total weight of the Fe-based hydrogenation catalyst, the total amount of the primary active metal component and the co-active element components is 20-70%, with the balance being a binder or carrier, in terms of oxides.

4. The Fe-based hydrogenation catalyst according to claim 3, wherein based on the total weight of the Fe-based hydrogenation catalyst, the total amount of the primary active metal component and co-active element components is 20-50%, with the balance being a binder or carrier, in terms of oxides.

5. The Fe-based hydrogenation catalyst according to claim 1, wherein the molar ratio of the primary active metal component to the second co-active element component is 5-100:1.

6. The Fe-based hydrogenation catalyst according to claim 1, which is prepared by an impregnation process, a coprecipitation process or a tableting process.

7. The Fe-based hydrogenation catalyst according to claim 6, wherein the impregnation process comprises steps of:
dissolving a salt of the primary active metal component, a salt of the first co-active metal component and a salt of the second co-active metal component into deionized water to form an impregnation solution;
adding the impregnation solution in a carrier to obtain a semi-finished catalyst product; and
leaving the semi-finished catalyst product still in air for 2-24 hours, then baking it to dryness, and further calcinating it in air atmosphere at 200-800° C. for 2-8 h to obtain the Fe-based hydrogenation catalyst.

8. The Fe-based hydrogenation catalyst according to claim 7, wherein the carrier includes one of pyrite, pyrrhotite, ferric oxide, ferroferric oxide, alumina, silica, amorphous aluminosilicate, and zeolite molecular sieve, or combination of more than one members thereof.

9. The Fe-based hydrogenation catalyst according to claim 6, wherein the coprecipitation process comprises steps of:
mixing uniformly an aqueous solution of a salt of the primary active metal component, a salt of the first co-active element component and a salt of the second co-active metal component with an aqueous solution of a precipitant;
subsequently stirring and reacting the mixture in a water bath at 40-95° C. for 1-24 hours, and then leaving the resultant still for aging in a water bath at 40-95° C. for 2-48 hours to obtain a precipitate;
subjecting the precipitate to filtration, water-washing and baking to dryness, to obtain a catalyst precursor;
calcinating the catalyst precursor in air atmosphere at 200-800° C. for 2-8 hours to obtain a metal oxide; and
mixing the metal oxide and a binder, and subjecting the mixture to a molding process to obtain the Fe-based hydrogenation catalyst.

10. The Fe-based hydrogenation catalyst according to claim 9, wherein the binder includes one of alumina, silica sol, alumina sol and water glass, or combination of more than one members thereof.

11. The Fe-based hydrogenation catalyst according to claim 9, wherein the precipitant includes one of NaOH, KOH, $Na_2CO_3$, $K_2CO_3$, $Na_2S$, $(NH_4)_2S$, urea and ammonia, or combination of more than one members thereof; and wherein the molar ratio of the precipitant to the total molar amount of primary active metal component, the first co-active metal component and the second co-active element component is 1-6:1.

12. The Fe-based hydrogenation catalyst according to claim 7, wherein the salt of the primary active metal component includes one of ferric nitrate, ferric sulfate, ferric chloride, and ferric phosphate, or combination of more than one members thereof; and the salt of the first co-active metal component includes one of nitrate, sulfate, chloride, and phosphate, or combination of more than one members thereof.

13. The Fe-based hydrogenation catalyst according to claim 6, wherein the tableting process comprises steps of:
  mixing uniformly a salt of the primary active metal component, a salt of the first co-active element component and a salt of the second co-active metal component;
  baking the mixture to dryness, and further calcinating the resultant in air atmosphere at 200-800° C. for 2-8 h to obtain a powder of oxides of the Fe-based hydrogenation catalyst; and
  adding a small amount of water to the powder of oxides of the Fe-based hydrogenation catalyst, and placing the resultant into a tablet machine for tableting, to obtain the Fe-based hydrogenation catalyst.

14. The Fe-based hydrogenation catalyst according to claim 7, wherein the salt of the second co-active element component includes one of nitrate, sulfate, chloride and phosphate, or combination of more than one members thereof.

15. A method, comprising subjecting the Fe-based hydrogenation catalyst of claim 1 to a sulfurization process prior to a hydrogenation process for one selected from the group consisting of straight-run gasoline, straight-run diesel, coker gasoline, coker diesel, catalytic cracking gasoline, catalytic cracking diesel, atmospheric residue oil, vacuum residue oil, coal tar and deasphalted oil and heavy oils extracted from oil sand or shale, and mixed oils thereof.

16. The method according to claim 15, wherein the sulfurization process having is carried out at a temperature of 200-450° C., a pressure of 0.1-10 MPa, a time duration of 2-48 hours, a liquid hourly space velocity of 0.1-20 $h^{-1}$ and a hydrogen-to-oil volume ratio of 100-800.

17. The method according to claim 16, wherein the sulfurization process is carried out at a temperature of 280-380° C., a pressure of 2-6 MPa, a time duration of 6-24 hours, a liquid hourly space velocity of 1-4 $h^{-1}$ and a hydrogen-to-oil volume ratio of 200-500.

18. The method according to claim 15, wherein the hydrogenation process is carried out at a temperature of 200-600° C., a pressure of 1-20 MPa, a liquid hourly space velocity of 0.1-10 $h^{-1}$ and a hydrogen-to-oil volume ratio of 100-2000.

19. The method according to claim 18, wherein the hydrogenation process has a temperature of 250-400° C., a pressure of 2-10 MPa, a liquid hourly space velocity of 0.5-8 $h^{-1}$ and a hydrogen-to-oil volume ratio of 200-1000.

\* \* \* \* \*